(12) United States Patent
Miyamoto

(10) Patent No.: US 6,896,861 B2
(45) Date of Patent: May 24, 2005

(54) SILICON OXIDE LAYER REDUCED IN DANGLING BONDS THROUGH TREATMENT WITH HYPOFLUOROUS ACID, PROCESS FOR GROWING SILICON OXIDE LAYER AND METHOD FOR DEACTIVATING DANGLING BONDS THEREIN

(75) Inventor: Yoshiyuki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 368 days.

(21) Appl. No.: 10/192,732

(22) Filed: Jul. 11, 2002

(65) Prior Publication Data

US 2003/0017347 A1 Jan. 23, 2003

(30) Foreign Application Priority Data

Jul. 18, 2001 (JP) .......................... 2001-218269

(51) Int. Cl.[7] ...................... H01L 21/316; B32B 9/04
(52) U.S. Cl. ..................... 423/335; 423/266; 423/274; 438/585; 438/778; 428/446
(58) Field of Search ................... 423/335, 266, 423/274, 338, 339; 438/585, 778; 428/446

(56) References Cited

U.S. PATENT DOCUMENTS

| | | | | |
|---|---|---|---|---|
| 5,554,570 A | * | 9/1996 | Maeda et al. | 438/763 |
| 6,383,346 B2 | * | 5/2002 | Ando et al. | 204/192.26 |
| 6,703,302 B2 | * | 3/2004 | Miyajima et al. | 438/622 |
| 2003/0037568 A1 | * | 2/2003 | Fujiwara et al. | 65/17.4 |
| 2003/0195107 A1 | * | 10/2003 | Ikuta et al. | 501/57 |
| 2003/0214040 A1 | * | 11/2003 | Yamashita et al. | 257/758 |

* cited by examiner

Primary Examiner—Ngoc-Yen Nguyen
(74) Attorney, Agent, or Firm—Sughrue Mion, PLLC

(57) ABSTRACT

Dangling bonds of silicon atoms tend to take place in silicon oxide grown on a silicon wafer due to oxygen deficiency; hypofluorous acid is introduced into the silicon oxide so that the hypofluorous acid reaches the dangling bonds through diffusion; the hypofluorous acid is decomposed into fluorine atoms and hydroxyl groups, and the fluorine atoms and hydroxyl groups deactivate the dangling bonds of silicon atoms; even if electric charges are injected into the silicon oxide, the deactivation is never broken so that the silicon oxide layer is stable and highly reliable.

25 Claims, 2 Drawing Sheets

US 6,896,861 B2

SILICON OXIDE LAYER REDUCED IN DANGLING BONDS THROUGH TREATMENT WITH HYPOFLUOROUS ACID, PROCESS FOR GROWING SILICON OXIDE LAYER AND METHOD FOR DEACTIVATING DANGLING BONDS THEREIN

FIELD OF THE INVENTION

This invention relates to a dangling bond deactivating technology and, more particularly, to a silicon oxide layer, a process for growing a silicon oxide layer on a silicon layer and a method for deactivating dangling bonds in the silicon oxide.

DESCRIPTION OF THE RELATED ART

In a fabrication of an integrated circuit on a silicon wafer, silicon oxide is repeatedly grown on and over the silicon wafer. The silicon oxide is preferable for the electrical insulation in the integrated circuit. A gate insulating layer is, by way of example, an indispensable component layer to a field effect transistor, and is usually formed of silicon oxide. When a manufacturer starts to fabricate bulk field effect transistors, the manufacturer forms a field oxide layer for defining active regions in the surface portion of the silicon wafer, and thermally grows silicon oxide on the surface portions of the active regions. However, the silicon oxide thus grown on the wafer is lattice mismatched with the silicon. This results in oxygen deficiency in the silicon oxide layer. This means that silicon atoms have dangling bonds in the vicinity of the oxygen deficient portions. The dangling bonds capture electrons, and the electrons undesirably influence the properties of the silicon oxide layer. For example, leakage current flows the silicon oxide layer due to the electrons captured by the dangling bonds, and makes the silicon oxide layer, which is expected to serve as an insulating layer, unreliable. When the silicon oxide layer is expected to serve as the gate insulating layer, the influences of the dangling bonds are serious, because the field effect transistor does not operate on the designed gate voltage-to-drain current characteristics.

The circuit components of integrated circuits have been miniaturized, and, accordingly, the gate insulting layers are reduced to 10 nanometers thick or less. In these circumstances, the influences of dangling bonds are more serious. The manufacturers desire a perfect deactivation technology to the dangling bonds.

There have been proposed various deactivation technologies to the dangling bonds of silicon atoms. Certain chemical species are introduced into the boundary between silicon and silicon oxide. However, those chemical species tend to damage non-oxygen deficient portion of the silicon oxide layer. Moreover, precise controlling technologies such as a precise concentration control and precise temperature control are required for the prior art chemical species.

Hydrogen is a typical example of the chemical species. The hydrogen surely deactivates the dangling bonds of silicon. However, when electric charges are injected into the silicon oxide layer, the electric charges break the bonds between the silicon and the hydrogen, and make the dangling bonds active, again.

Fluorine is another example of the chemical species. When the fluorine atoms are introduced into the silicon oxide layer, the fluorine also deactivates the dangling bonds of silicon. Although the fluorine is more resistive against the electric charge than the hydrogen, the fluorine atoms are negatively charged in the non-oxygen deficient portion. The negatively charged fluorine atoms are thermally activated in high temperature ambience, and tend to destroy the chemical bonds of the silicon oxide. Thus, if fluorine is excessively introduced into the silicon oxide, the residual fluorine atoms deteriorate the insulation property of the silicon oxide more serious than the hydrogen atoms do.

SUMMARY OF THE INVENTION

It is therefore an important object of the present invention to provide a silicon compound layer, which is reduced in dangling bonds without reactivation due to an electric charge injection and destruction due to excess fluorine atoms.

It is also an important object of the present invention to provide a process for growing silicon compound on a silicon layer without precise controlling technologies.

It is another important object of the present invention to provide a method for permanently deactivating dangling bonds in a silicon compound layer grown on a silicon layer.

To accomplish the object, the present invention proposes selectively to bond fluorine atoms and hydroxyl groups to silicon atoms having dangling bonds.

In accordance with one aspect of the present invention, there is provided silicon insulator having a crystal structure formed by silicon atoms and atoms of at least one element which imparts electrical insulation property to the silicon insulator, and the crystal includes a regular portion where the silicon atoms are bonded to the atoms of the at least one element without dangling bonds and a dangling bond portion where the silicon atoms are selectively bonded to fluorine atoms and hydroxyl groups for deactivating dangling bonds of the silicon atoms.

In accordance with another aspect of the present invention, there is provided a process for growing silicon insulator on a silicon layer comprising the steps of a) preparing a silicon layer, b) growing silicon insulator on the silicon layer for forming a silicon insulator layer, c) introducing fluorine atoms and hydroxyl groups into the silicon insulator layer so as to deactivate dangling bonds of silicon atoms in the silicon insulator and d) completing the silicon insulator layer.

In accordance with yet another aspect of the present invention, there is provided a method for deactivating dangling bonds of silicon atoms in silicon insulator comprising the steps of a) introducing hypofluorous acid into a silicon insulator grown on a silicon layer, b) decomposing the hypofluorous acid into fluorine atoms and hydroxyl groups in the vicinity of dangling bonds of silicon atoms in the silicon insulator and c) making the fluorine atoms and the hydroxyl groups selectively bonded to the silicon atoms having the dangling bonds for deactivating the dangling bonds.

BRIEF DESCRIPTION OF THE DRAWINGS

The features and advantages of the silicon oxide layer, process and method will be more clearly understood from the following description taken in conjunction with the accompanying drawings, in which.

DESCRIPTION OF THE PREFERRED EMBODIMENT

Figure 1:
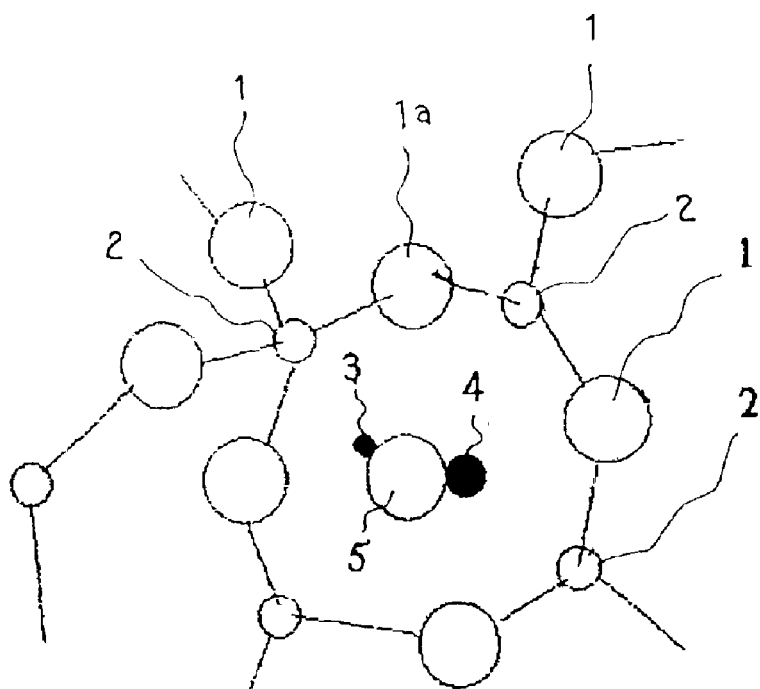
FIG. 1 is a schematic view showing a hydrogen atom, a fluorine atom and an oxygen atom in the crystal structure of silicon oxide.

In the following description, term "silicon insulator layer" means a pure silicon compound layer and a layer mainly composed of silicon compound. A silicon oxide layer is fallen within the definition of the "silicon insulator layer", because the silicon oxide is a sort of the silicon compound. Even if dopant impurity of the order of ppm is introduced into the silicon oxide, the doped silicon oxide layer is still fallen within the definition of the "silicon insulator layer", because the doped silicon oxide layer is mainly composed of silicon oxide.

A silicon insulator layer is assumed to be grown on a silicon layer. The silicon insulator has a crystal structure in which silicon atoms have dangling bonds due to deficiency of element to be bonded to the silicon atoms. The silicon atoms with the dangling bonds form parts of crystal, and the parts of crystal are hereinbelow referred to as "dangling bond portions". On the other hand, the remaining part of the crystal does not contain silicon atoms having dangling bonds. The remaining part is hereinbelow referred to as "regular portion". The dangling bond portions are deactivated partially with fluorine and partially with hydroxyl group. The regular portion does not have chemical bonds to both fluorine and hydroxyl group. Silicon oxide and doped silicon oxide are examples of the silicon compound so that the silicon insulator layer may be formed of silicon oxide or doped silicon oxide.

While the silicon insulator layer is growing on a silicon layer such as, for example, a silicon wafer, the dangling bond portions unavoidably take place in the silicon compound. Fluorine atoms and hydroxyl groups are supplied to the surface of the silicon compound layer so as to deactivate the dangling bond portions. However, the fluorine atoms and hydroxyl groups do not react with silicon atoms in the regular portion.

Hypofluorous acid is preferable for the deactivation. The hypofluorous acid may be supplied to the surface of the silicon compound layer at an initial stage of the growth and/or upon completion of the growth. Gaseous hypofluorous acid may be supplied to the surface of the silicon compound. It is desirable to prevent the hypofluorous acid from oxygen before reaching the dangling bonds. The hypofluorous acid is decomposed in the presence of the oxygen, and the decomposed hypofluorous acid is wasteful. Only decomposed hypofluorous acid in the vicinity of the dangling bonds participates in the deactivation. Thus, it is preferable to expose the silicon insulator alternately to the oxygen and hypofluorous acid gas. However, the decomposed hypofluorous acid does not have any undesirable influences on the silicon insulator. Otherwise, a molecular beam of the hypofluorous acid may be radiated onto the surface of the silicon compound.

The hypofluorous acid is stable in the regular portion of silicon oxide and the regular portion of doped silicon oxide. When the hypofluorous acid reaches the dangling bond portion, the hypofluorous acid is decomposed into fluorine atoms and hydroxyl groups, and the fluorine atoms and hydroxyl groups independently deactivate the dangling bonds of the silicon atoms. The fluorine atoms and hydroxyl groups keep the dangling bonds deactivated against electric charges injected through external electric field. This results in the highly reliable silicon insulator layer. Even if the hypofluorous acid is left in the silicon insulator layer, the residual hypofluorous acid does not react with the silicon, and the silicon insulator keeps the initial insulating property. Although the residual hypofluorous acid stays in the lattice, the hypofluorous acid does not influence the insulating properties of the silicon insulator. This results in that the manufacturer does not require a precise controlling technology against the residual hypofluorous acid.

Example of Silicon Insulator Layer

Silicon oxide is a typical example of the silicon insulator. As described hereinbefore, oxygen deficiency takes place in the crystal due to the lattice mismatch between the silicon oxide layer and a silicon layer thereunder, and the silicon atoms have dangling bonds in the crystal. The dangling bonds create energy levels in the band gap of the silicon oxide, and the energy levels serve as trap centers in the band gap. In this situation, when the silicon oxide layer is biased, electric charges are trapped in those energy levels, and are conveyed through the silicon oxide layer. This results in leakage current.

The leakage current is to be minimized by reducing the energy levels or trap centers in the band gap as few as possible. From this point of view, it is preferable to introduce chemical species for deactivating the dangling bonds of silicon atoms. The chemical species is expected surely to deactivate the dangling bonds of silicon as well as not to have any serious influence on properties of silicon oxide.

Hypofluorous acid is preferable. The hypofluorous acid deactivates the dangling bonds of silicon atoms and, accordingly, reduces the energy levels in the band gap of the silicon oxide. Although hypofluorous acid is effective against the dangling bonds of silicon atoms, the hypofluorous acid does not react with the regular portions of the silicon oxide. Thus, the hypofluorous acid meets the above-mentioned two requirements, and makes the silicon oxide layer highly reliable.

The hypofluorous acid behaves in the silicon oxide as follows. The present inventor carried out the first principles simulation, and found that hypofluorous acid molecule had the energy level of bonding orbital and the energy level of antibonding orbital out of the energy bad of the regular potions of silicon oxide. This meant that the hypofluorous acid did not react with the silicon oxide in the regular portion.

FIG. 1 shows the crystal of a regular portion of silicon oxide. Oxygen atoms 1 are bonded to silicon atoms 2 so as to form the silicon-oxygen lattice. Hypofluorous acid is assumed to be introduced into the crystal of the regular portion of silicon oxide. The hypofluorous acid, which consists of a hydrogen atom 3, a fluorine atom 4 and oxygen atom 5, does not react with the silicon oxide, and is diffused or stays in the silicon-oxygen lattice. This means that the hypofluorous acid does not damage the silicon oxide. Although the fluorine atom, fluorine molecule and hydrogen atom are charged, the hypofluorous acid molecule is never charged. Thus, the hypofluorous acid does not have any serious influence on the silicon oxide in the regular portion. The present inventor further confirmed through first principles simulation that the hypofluorous acid was strongly interactive between dangling bonds of silicon atoms and the antibonding orbital thereof in the dangling bond portion and that the hypofluorous acid was decomposed into fluorine atom and hydroxyl group at room temperature. There were two dangling bonds in the vicinity of the oxygen deficiency. The fluorine atom and hydroxyl group were bonded to the silicon atoms, and the dangling bonds were deactivated with the fluorine atom and hydroxyl group.

Figure 2:
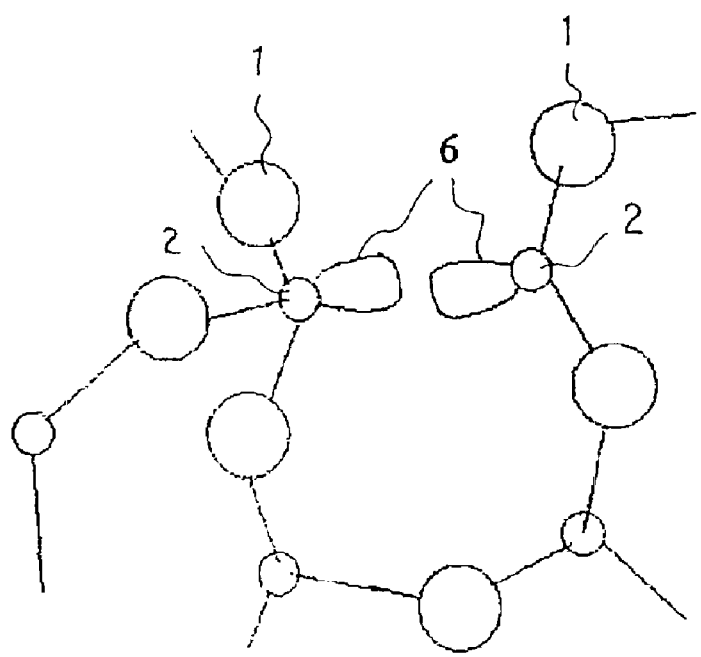
FIG. 2 is a schematic view showing dangling bonds of silicon atoms in the silicon oxide.
Figure 3:
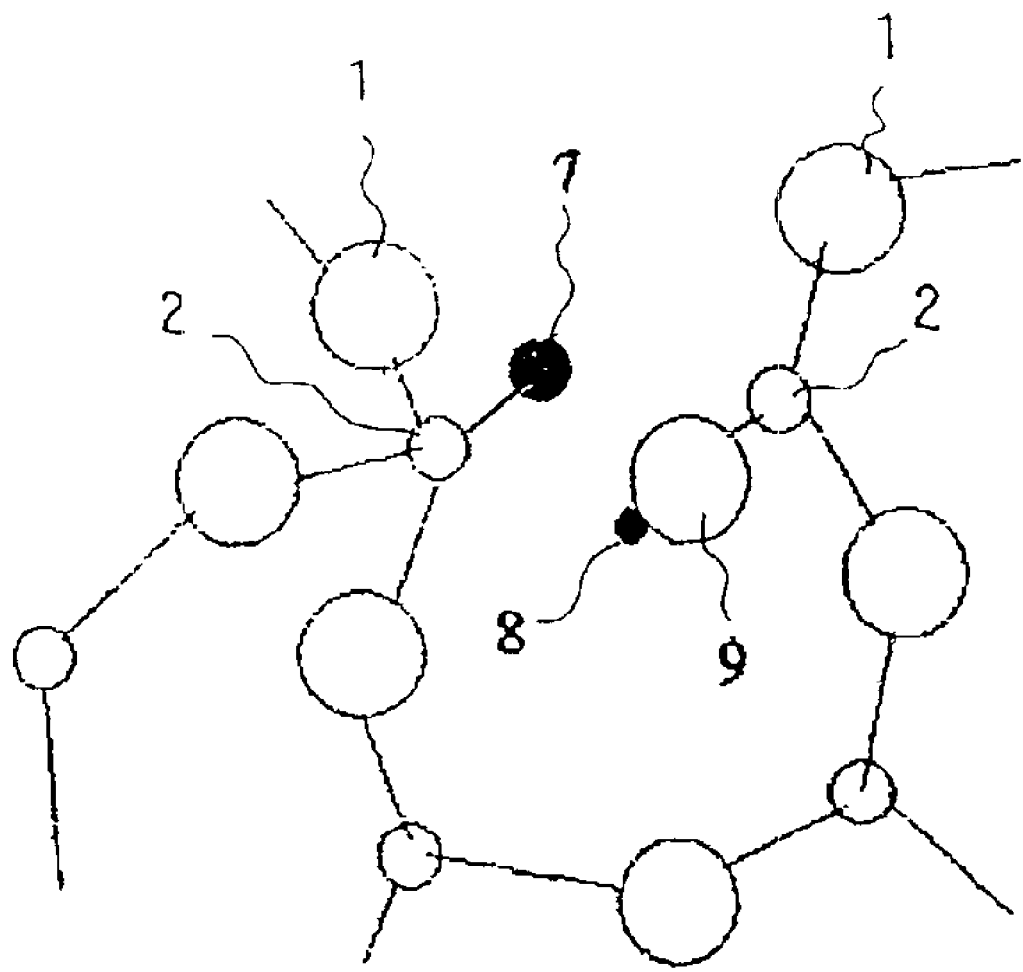
FIG. 3 is a schematic view showing the dangling bonds deactivated with a fluorine atom and a hydroxyl group.

FIG. 2 shows a crystal in the dangling bond portion. Oxygen atoms 1 and silicon atoms 2 form a silicon-oxygen lattice. However, the oxygen atom 1a (see FIG. 1) is eliminated from the silicon-oxygen lattice. This results in two dangling bonds 6 of silicon atoms 2. The dangling bonds 6 create energy levels in the band gap of silicon oxide. When a hypofluorous acid molecule is decomposed at room temperature, the fluorine atom 7 and hydroxyl group 8/9 deactivate the two dangling bonds as shown in FIG. 3. This means that the fluorine atom 7 and hydroxyl group 8/9 eliminate the energy levels from the band gap of the silicon oxide.

The present inventor further confirmed through the first principles simulation that injected electric charges did not release the fluorine atom and hydroxyl group from the silicon atoms. Even bias voltage is applied to the silicon oxide layer, the fluorine atom 7 and hydroxyl group 8/9 continuously deactivate the dangling bonds of silicon atoms, and keep the silicon oxide layer insulating. Thus, the deactivation with the hypofluorous acid is substantially permanent. In other words, the silicon oxide layer treated with the hypofluorous acid is highly reliable.

As will be understood from the foregoing description, the dangling bonds in the silicon oxide are deactivated with fluorine atoms and hydroxyl groups decomposed from hypofluorous acid, and the deactivation is stable against electric charge. Even though the manufacturer reduces the thickness of the silicon oxide layer, the silicon oxide layer keeps the leakage current negligible. Thus, the silicon oxide layer treated with the hypofluorous acid is highly reliable, and is available for ultra large scale integration devices in the next generation.

Growing Process & Deactivation Method

Description is hereinbelow made on plural processes for growing silicon insulator according to the present invention. A method for deactivating dangling bonds according to the present invention is employed in these processes, and dangling bonds of silicon atoms are deactivated through the method.

The first silicon oxide growing process proceeds as follows. First, a silicon wafer is prepared. The silicon wafer is inserted into a chamber of a quartz tube, and the air is evacuated from the quartz tube. The silicon wafer is exposed to oxygen-containing gas at 800 degrees to 1000 degrees in centigrade. Gaseous mixture of oxygen and nitrogen may be used as the oxygen-containing gas. The oxygen reacts with the silicon, and the silicon wafer is thermally oxidized for several minutes. The thermal growth in the several minutes is hereinbelow referred to as "initial oxidation stage", and the initial oxidation stage is defined as "period in which dangling bonds take place at silicon atoms in the vicinity of the oxygen deficient portion". Silicon oxide is grown on the silicon wafer, and dangling bonds take place at the silicon atoms at the boundary between the silicon wafer and the silicon oxide layer due to the oxygen deficiency. Although the thickness of silicon oxide layer is depending upon the conditions in the initial oxidation stage, the silicon oxide is grown to 0.5 nanometer thick, i.e., 5 angstroms thick or less during the initial oxidation.

The oxygen-containing gas is stopped. Hypofluorous gas is supplied to the chamber for deactivating the dangling bonds of silicon atoms. A small amount of oxygen may be left in the chamber. The residual oxygen reacts with the hypofluorous acid gas, and the hypofluorous acid is decomposed in the chamber. It is wasteful. However, there is not any serious influence on the silicon oxide layer. The hypofluorous acid gas may be carried by carrier gas. The silicon oxide layer is exposed to the hypofluorous acid-containing gas. The hypofluorous acid is diffused through the silicon oxide layer, and reaches dangling bond portions. Then, the hypofluorous acid is decomposed into fluorine atoms and hydroxyl groups, and the fluorine atoms and hydroxyl groups are bonded to the silicon atoms so as to deactivate the dangling bonds. The treatment with the hypofluorous acid is hereinbelow referred to as "deactivation stage". It is desirable to deactivate the dangling bonds as many as possible. Although a few dangling bonds may be left in the lattice, the dangling bonds are ignoreable. Most of the dangling bonds are surely deactivated through the deactivation stage. As described in conjunction of the silicon oxide layer according to the present invention, residual hypofluorous acid merely stays in the silicon-oxygen lattice, and does not have any serious influence on the silicon oxide. For this reason, it is not necessary not to precisely control the amount of hypofluorous acid diffused into the silicon oxide layer.

Upon completion of the deactivation stage, the supply gas is changed from the hypofluorous acid-containing gas to the oxygen-containing gas. The thermal oxidation is carried out under the conditions same as those in the initial oxidation stage. The thermal oxidation after the deactivation stage is referred to as "post thermal oxidation stage". The silicon oxide layer reaches a target thickness through the post thermal oxidation stage. The target thickness may be equal to or less than 10 nanometers.

The second silicon oxide growing process also starts with preparation of a silicon wafer. The silicon wafer is inserted into the chamber of a quartz tube, and silicon oxide is grown to a target thickness under the conditions same as those of the initial oxidation stage except for the oxidation time. Although the dangling bonds have taken place in the crystal during the growth for the several minutes, the silicon oxide is continuously grown without any interruption.

Upon completion of the oxidation stage, the oxygen-containing gas is stopped, and the hypofluorous acid-containing gas is supplied to the chamber. Dangling bonds may be increased at the boundary between the silicon wafer and the silicon oxide layer due to the thermal stress between the silicon wafer and the silicon oxide layer. The hypofluorous acid is diffused through the silicon oxide layer, and reaches the dangling bond portions. The hypofluorous acid is decomposed into fluorine atoms and hydroxyl groups in the dangling bond portions. The fluorine atoms and hydroxyl groups deactivate most of the dangling bonds. As described hereinbefore, it is not necessary precisely to control the amount of hypofluorous acid diffused into the silicon oxide, because the residual hypofluorous acid merely stays in the lattice without serious influence on the silicon oxide. The hypofluorous acid has long diffusion length so that the diffusion step does not set any limit to the thickness of the silicon oxide layer.

The third silicon oxide growing process also starts with preparation of a silicon wafer. Silicon oxide is grown to a target thickness as similar to the second silicon oxide growing process.

Upon completion of the thermal oxidation, the silicon wafer is taken out from the quartz tube, and is conveyed to a molecular beam implantation system. The silicon wafer, which has been already covered with the silicon oxide layer, is placed on a retainer, and the air is evacuated from the chamber of the molecular beam implantation system. Hypofluorous acid gas is pressurized so as to be injected from a nozzle. The hypofluorous acid molecules are accelerated at 50 eV to 100 eV, and is implanted into the silicon oxide layer. If the acceleration energy exceeds 100 eV, the silicon oxide is seriously damaged. On the other hand, if the acceleration energy is less than 50 eV, the hypofluorous acid does not reach the dangling bond portions. Thus, the acceleration energy is to be fallen within the range between 50 eV and 100 eV. It is not necessary to precisely control the total amount of hypofluorous acid implanted into the silicon oxide layer.

The molecular beam implantation is more desirable rather than an ion-implantation, because the molecular beam is not charged. If the hypofluorous acid molecules are charged, the reactivity is so strong that the charged hypofluorous acid molecules seriously damage the silicon oxide layer.

The hypofluorous acid is decomposed into fluorine atoms and hydroxyl groups, and the fluorine atoms and hydroxyl groups deactivate the dangling bonds of silicon atoms. After the molecular beam implantation, the silicon oxide layer is annealed at 600 degrees in centigrade for 30 minutes. The projection range sets a limit to the thickness of the silicon oxide layer. The maximum thickness is to be equal to or less than 5 nanometers thick, i.e., 50 angstroms thick. The deactivation through the molecular beam implantation is available for the silicon oxide layer between 1 nanometer thick and 5 nanometers thick.

As will be appreciated from the foregoing description, hypofluorous acid is introduced into the silicon oxide layers through the diffusion and molecular beam implantation. Although the excessive introduction of hypofluorous acid is uneconomical, the residual hypofluorous acid merely stays in the siliconoxygen lattice, and does not have any serious influence on the silicon oxide. This means that any precise controlling technology is not required for the deactivation of the dangling bonds.

In the growing process, it is preferable alternately to expose the silicon layer to oxygen and hypofluorous acid, because the hypofluorous acid is decomposed in the presence of the oxygen before the diffusion into the silicon oxide layer.

Although particular embodiments of the present invention have been shown and described, it will be apparent to those skilled in the art that various changes and modifications may be made without departing from the spirit and scope of the present invention.

The silicon oxide may be grown on a single crystal silicon layer already grown over a silicon wafer.

The present invention, the deactivation with the hypofluorous acid is desirable for dry processes. The deactivation with the hypofluorous acid is less desirable for wet processes, because the hypofluorous acid possibly reacts with the water before the deactivation.

Even if the dangling bonds are deactivated after the initial oxidation stage, hypofluorous acid may be introduced into the silicon oxide layer upon completion of the growth.

What is claimed is:

1. Silicon insulator having a crystal structure formed by silicon atoms and atoms of at least one element which imparts electrical insulation property to said silicon insulator, said crystal structure including a regular portion where the silicon atoms are bonded to the atoms of said at least one element without dangling bonds and a dangling bond portion where the silicon atoms are selectively bonded to fluorine atoms and hydroxyl groups for deactivating dangling bonds of said silicon atoms.

2. The silicon insulator as set forth in claim 1, in which said regular portion of said crystal structure is formed by said atoms of said at least one element bonded to said silicon atoms without silicon atoms bonded to said fluorine atoms and said hydroxyl groups.

3. The silicon insulator as set forth in claim 1, in which said fluorine atoms and said hydroxyl groups are decomposed from hypofluorous acid introduced into said silicon insulator.

4. The silicon insulator as set forth in claim 1, in which said at least one element is oxygen.

5. The silicon insulator as set forth in claim 4, in which said fluorine atoms and said hydroxyl groups are decomposed from hypofluorous acid introduced into the silicon oxide serving as said silicon insulator.

6. The silicon insulator as set forth in claim 5, in which the hypofluorous acid molecules stays in said regular portion without decomposition.

7. A process for growing silicon insulator on a silicon layer, comprising the steps of:
   a) preparing a silicon layer;
   b) growing silicon insulator on said silicon layer for forming a silicon insulator layer;
   c) introducing fluorine atoms and hydroxyl groups into said silicon insulator layer so as to deactivate dangling bonds of silicon atoms in said silicon insulator; and
   d) completing said silicon insulator layer.

8. The process as set forth in claim 7, in which said silicon insulator has a crystal structure having a regular portion where the silicon atoms are bonded to atoms of at least one element imparting electrical insulation property to said silicon insulator without any silicon atom bonded to a fluorine atom or a hydroxyl group and a dangling bond portion where the silicon atoms are selectively bonded to fluorine atoms and hydroxyl groups for deactivating dangling bonds of said silicon atoms in said step c).

9. The process as set forth in claim 8, in which said at least one element is oxygen so that silicon oxide has said crystal structure.

10. The process as set forth in claim 7, in which said fluorine atoms and said hydroxyl groups are decomposed from hypofluorous acid in the vicinity of said dangling bonds in said step c).

11. The process as set forth in claim 10, in which said silicon insulator has a crystal structure having a regular portion where the silicon atoms are bonded to oxygen atoms and a dangling bond portion where the silicon atoms are selectively bonded to said fluorine atoms and said hydroxyl groups for deactivating dangling bonds of said silicon atoms in said step c), and the hypofluorous acid molecules stays in said regular portion without decomposition.

12. The process as set forth in claim 7, in which said silicon insulator is grown to thickness equal to or less than 0.5 nanometer in said step b), and the growth of said silicon insulator restarts in said step d).

13. The process as set forth in claim 12, in which said silicon insulator is exposed to gas containing hypofluorous acid in said step c) so that said hypofluorous acid is decomposed into said fluorine atoms and said hydroxyl groups in said dangling bond portion after diffusion through said silicon insulator.

14. The process as set forth in claim 13, in which said step c) includes the sub-steps of
   c-1) stopping gas containing oxygen for interrupting the growth of said silicon insulator,
   c-2) exposing said silicon insulator to gas containing hypofluorous acid so that said hypofluorous acid is diffused through said silicon insulator layer to said silicon atoms having said dangling bonds, and c-3) decomposing said hypofluorous acid into said fluorine atoms and said hydroxyl groups so as to deactivate said dangling bonds.

15. The process as set forth in claim 7, in which said silicon insulator is grown to a target thickness in said step b) so that said silicon insulator is not grown in said step d).

16. The process as set forth in claim 15, in which said step c) includes the sub-steps of c-1) stopping gas containing oxygen for interrupting the growth of said silicon insulator, c-2) exposing said silicon insulator to gas containing hypofluorous acid so that said hypofluorous acid is diffused through said silicon insulator layer to said silicon atoms having said dangling bonds, and c-3) decomposing said hypofluorous acid into said fluorine atoms and said hydroxyl groups so as to deactivate said dangling bonds.

17. The process as set forth in claim 7, in which a beam of hypofluorous acid molecules is implanted into said silicon insulator in said step c).

18. The process as set forth in claim 17, in which said beam of hypofluorous acid molecules is accelerated at 50 eV to 100 eV.

19. The process as set forth in claim 18, in which said silicon insulator has thickness fallen within a range between 1 nanometer thick to 5 nanometers thick.

20. The process as set forth in claim 17, in which said silicon insulator implanted with said molecules is annealed in said step d).

21. The process as set forth in claim 20, in which the anneal is carried out at 600 degrees in centigrade for 30 minutes in said step d).

22. A method for deactivating dangling bonds of silicon atoms in silicon insulator, comprising the steps of:

a) introducing hypofluorous acid into a silicon insulator grown on a silicon layer;

b) decomposing said hypofluorous acid into fluorine atoms and hydroxyl groups in the vicinity of dangling bonds of silicon atoms in said silicon insulator; and c) making said fluorine atoms and said hydroxyl groups selectively bonded to said silicon atoms having said dangling bonds for deactivating said dangling bonds.

23. The method as set forth in claim 21, in which said silicon insulator is silicon oxide.

24. The method as set forth in claim 23, in which said hypofluorous acid is introduced into said silicon oxide by exposing said silicon oxide to gas containing said hypofluorous acid.

25. The method as set forth in claim 23, in which said hypofluorous acid is introduced into said silicon oxide by implanting molecules of said hypofluorous acid into said silicon oxide.

* * * * *